3,043,817
METHOD OF PRODUCT CONTROL IN AQUEOUS SUSPENSION POLYMERIZATIONS OF ALKENYL AROMATIC COMPOUNDS
Alex K. Jahn and Ernest J. Gillard, Midland, Mich., assignors to The Dow Chemical Company, Midland, Mich., a corporation of Delaware
No Drawing. Filed Sept. 19, 1958, Ser. No. 761,928
9 Claims. (Cl. 260—88.2)

This invention concerns a method for the polymerization of suspensions of monomeric alkenyl aromatic compounds in liquids which the non-solvents both for the alkenyl aromatic compounds and for the polymer products. It relates more particularly to an improvement in the aqueous suspension polymerization of alkenyl aromatic compounds which normally pass from a liquid to a sticky semi-liquid agglomerative state and from thence to a non-sticky granular condition in the process of their polymerization in a non-solvent aqueous medium and pertains especially to a method of making latent-foaming alkenyl aromatic resin compositions in the form of discrete particles.

The term "suspension" is used herein to designate dispersions of macroparticles which are maintained in a suspended condition in an aqueous non-solvent medium by a combination of agitation and a hydrophile or protective colloid.

In the preparation of most polymeric substances, it is a primary object to provide a product which is suitable for use in such typical plastics working operations as extrusion, injection molding, compression molding and the like. For such uses, it is highly desirable that the plastic being supplied to the molding or extrusion apparatus be not only uniform in composition but also substantially uniform as to particle size. It is often desirable that the feed be granular in character and preferably in the form of free flowing beads or rounded particles, particularly where the polymeric substance is a latent-foaming alkenyl aromatic resin composition, i.e. a normally solid alkenyl aromatic resin in the form of discrete particles having a volatile organic compound such as pentane, hexane, heptane, dichlorodifluoromethane, dichlorotetrafluoroethane, neopentane or the like uniformly dispersed throughout, which resin composition upon heating to its softening point or above and above the boiling point of the volatile organic compound expands to form a cellular mass. In the typical suspension polymerization wherein the material passes through the three successive stages outlined above, it has often occurred that the polymer product varied in particle size from very fine powder to coarse granules or pellets, and in the instance wherein latent-foaming alkenyl aromatic resin granules are prepared by polymerizing monomeric alkenyl aromatic compounds in admixture with a volatile organic compound, e.g. pentane, in an aqueous suspension it has been known that the product not only varies in particle sizes from fine powder to coarse granules, but also varies in density from coarse granules which are lighter than water to solid particles having a density greater than water, and the product frequently contains clusters of the particles which results from sticking together of the dispersed macroparticles in the sticky semi-liquid agglomerative state.

It is accordingly an object of the present invention to provide a method for the aqueous suspension polymerization of liquid monomeric alkenyl aromatic compounds, which normally pass from a liquid to a sticky agglomerative state and from thence to a non-sticky granular condition during such a polymerization which method inhibits clustering or coalescing of the dispersed monomers in the sticky agglomerative state. Another object is the provision of a method for the aqueous suspension polymerization of monomeric alkenyl aromatic compounds whereby there can be produced polymer particles of substantially uniform composition and particle size. A further object is to provide a method as aforesaid whereby there is produced a latent-foaming alkenyl aromatic polymer composition, the uniform particles of which are adapted to molding operations for making cellular plastic articles. A specific object of the invention is to provide such a method for the suspension polymerization of styrene and of polymerizable mixtures containing the same.

According to the invention the foregoing and related objects can be attained by a method which comprises providing a suspension or dispersion of a monomeric polymerizable alkenyl aromatic compound in an aqueous non-solvent medium containing a water-soluble polyvinyltoluene sulfonate, agitating and heating the suspension at a temperature which is known to induce polymerization until an appreciable amount of the monomers are polymerized and thereafter adding thereto a small but effective amount of a surface active agent, suitably an anionic or non-ionic emulsifying agent, prior to coalescing of the dispersed macroparticles as they reach the sticky semi-liquid or agglomerative state and continuing the polymerization until the monomer is polymerized to a normally solid non-sticky granular condition, i.e. until polymerization of the monomer is complete or substantially complete.

Monomeric alkenyl aromatic compounds which can be polymerized to solid free-flowing particles or beads having a density at least as great as that of water according to the invention are alkenyl aromatic compounds having the general formula Ar—CH=CH$_2$ wherein Ar represents an aromatic hydrocarbon radical, or an aromatic halohydrocarbon radical, of the benzene series. Examples of such alkenyl aromatic compounds are styrene, vinyltoluene, vinylxylene, ethylvinylbenzene, isopropyl styrene, tert.-butyl styrene, ar-chlorostyrene, ar-dichlorostyrene, ar-bromostyrene, ar-fluorostyrene, or ar-chlorovinyltoluene. Mixtures of from 99.5 to 99.99 percent by weight of any one or more of such monomeric monoalkenyl aromatic compounds and from 0.5 to 0.01 percent of a divinyl aromatic hydrocarbon such as divinylbenzene, divinyltoluene or divinylxylene can also be used. The monomeric alkenyl aromatic compounds can be polymerized alone or in admixture with a volatile organic compound which is a non-solvent for the polymer such as pentane, heptane, hexane, isooctane, dichlorodifluoromethane, dichlorotetrafluoroethane, neopentane, and the like, suitably in amount corresponding to from 2 to 25 percent by weight of the monomers, to form solid free-flowing granules of the polymer, or latent-foaming polymer compositions, in the instance where the polymerization is carried out in admixture with a volatile organic compound. The polymerization can be carried out at temperatures between 70° and 120° C. and at atmospheric or superatmospheric pressure.

The polymeriztion is carried out while having the monomers dispersed in an aqueous liquid containing a polyvinyltoluene sulfonate as dispersant or protective colloid. The polyvinyltoluene sulfonate to be employed can be an alkali salt, i.e. an ammonium, sodium, potassium or lithium salt, of sulfonated polyvinyltoluene containing an average of from 0.85 to 1 sulfonic acid group per vinyltoluene residue in the polymer. Such salts of sulfonated polyvinyltoluene are readily soluble or dispersible in water and are effective agents for maintaining the monomeric alkenyl aromatic compounds suspended as macroparticles or droplets in the aqueous medium. The polyvinyltoluene sulfonate can be employed in amounts corresponding to from about 0.017 to 0.4, preferably from 0.1 to 0.2, percent by weight of the water initially used. It is advantageous that the polyvinyltoluene sulfonate be uniformly dispersed or dissolved in the water and for such purpose the polyvinyltoluene sulfonate, suitably as an aqueous 5 to 15 weight percent solution of the same, is preferably passed through a homogenizer prior to its being employed as the dispersant in the aqueous polymerization medium.

The surface active agent to be employed in the polymerization can be an anionic or a non-ionic surfactant or emulsifying agent such as sodium stearate, sodium oleate, dihexyl ester of sulfosuccinic acid sodium salt, dioctyl ester of sulfosuccinic acid sodium salt, fatty alcohol sodium sulfate, dodecylbenzene sulfonic acid sodium salt or alkylphenoxy polyoxyethylene ethanols, which surfactant is soluble in water in amounts corresponding to a concentration at least as great as the concentration in which it is employed. The surfactant is advantageously employed in amounts corresponding to from 0.005 to 0.5 percent by weight, based on the weight of the aqueous suspension or water initially used, but somewhat greater or lesser proportions can be employed.

The water can be employed in any desired proportions based on the weight of the alkenyl aromatic compounds used, but is usually employed in amount sufficient to form the continuous phase with the alkenyl aromatic compounds being dispersed or suspended therein. Suitable proportions of water or aqueous phase to monomer are ratios of from 1:1 to 4:1, although other proportions can be used.

It is important and advantageous that the surfactant be added to the polymerization after an appreciable amount of the monomers have been polymerized and prior to the materials reaching the semi-liquid agglomerative state which results in coalescing of the dispersed particles to a gummy mass. The adding of an anionic surfactant such as dihexylester of sulfosuccinic acid sodium salt, or a fatty alcohol sodium sulfate to the suspension at the start of the polymerization has little or no effect on inhibiting or preventing the coalescing of the suspended material when it reaches the agglomerative state, whereas the adding of such a surfactant to the mixture after appreciable polymerization has occurred results in complete inhibition of agglomerates. The polymerization can be carried out to obtain discrete particles of the polymer by adding a non-ionic surfactant such as a water soluble alkylphenoxy polyoxyethylene ethanol to the mixture at the start of the polymerization, but is advantageously carried out by adding the non-ionic surfactant to the mixture after appreciable polymerization has occurred and before the materials reach the sticky agglomerative state and the particles begin to coalesce.

The surfactant is advantageously added to the mixture after from about 8 to 60, preferably from 20 to 60 percent by weight of the monomers are polymerized and before the materials reach the sticky agglomerative state where the particles coalesce.

The polymerization is accelerated by the addition of per-oxygen catalysts such as benzoyl peroxide, lauroyl peroxide, tert.-butyl peroxide, cumene hydroperoxide, dicumyl peroxide, di-tert.-butyl peroxide, diisopropylbenzene hydroperoxide and the like, or mixtures of any two or more of such polymerization catalysts. The catalyst can be employed in amounts corresponding to from 0.01 to 5, preferably from 0.02 to 3, percent by weight of the polymerizable monomers initially used.

In practice an aqueous suspension comprising a monomeric polymerizable alkenyl aromatic compound, e.g. styrene or styrene in admixture with a volatile organic compound such as pentane in amount corresponding to about 10 percent by weight of the styrene, dispersed or suspended as droplets in an aqueous solution containing from 0.017 to 0.4 percent by weight of an alkali salt, suitably the ammonium salt, of a polyvinyltoluene sulfonic acid containing an average of from 0.85 to 1 sulfonate group per vinyltoluene residue in the polymer, is agitated and heated at temperatures between 70° and 120° C. in a suitable vessel at atmospheric or superatmospheric pressure sufficient to maintain the non-aqueous materials substantially in liquid condition until an appreciable amount of the monomer is polymerized. After polymerization of from about 8 to 60, preferably from 20 to 60, percent by weight of the monomers has occurred there is added to the mixture a small but effective amount of an anionic or a nonionic surfactant, suitably dissolved in a small amount of water. The polymerization is continued until the monomer is polymerized to a normally solid non-sticky granular condition. Thereafter the mixture is cooled to a temperature below the softening point of the polymer, e.g. to 40° C. or below and the mixture is removed from the polymerization vessel. The polymer is separated from the aqueous medium in usual ways, e.g. by filtering or centrifuging and is washed and dried.

The following examples illustrates ways in which the principle of the invention has been applied, but are not to be construed as limiting its scope.

EXAMPLE 1

(A) A charge of 929 grams of monomeric styrene and 71 grams of isooctane was placed in a glass reaction vessel equipped with a reflux condenser and stirrer. An aqueous solution consisting of 1248 grams of water, 0.313 gram of potassium dichromate, 12.5 grams of an aqueous 10 weight percent solution of sulfonated polyvinyltoluene, containing 23 percent by weight of polyvinyltoluene sulfonic acid, ammonium salt, and 77 percent of ammonium sulfate (solute basis), and sufficient ammonium hydroxide to bring the solution to a pH value of 6, was added to the reaction vessel. The sulfonated polyvinyltoluene employed in the experiment contained an average of 0.9 sulfonate group of the formula $-SO_3NH_4$ per vinyltoluene residue in the homopolymer. It was soluble in water. Prior to employing the sulfonated polyvinyl toluene in the experiment, the aqueous 10 weight percent solution of the same was passed through a homogenizer to thoroughly disperse the polyvinyltoluene sulfonate in the aqueous solution. The resulting mixture of the monomeric styrene, the isooctane and the aqueous solution contained the polyvinyltoluene sulfonate as dispersing agent, in the reaction vessel was agitated by rotating the stirrer at a rate of 300 r.p.m. to disperse the organic water-immiscible materials as globules in the aqueous medium, and the mixture was heated to a temperature of 70° C. in a period of 2 hours. Thereafter, the mixture was stirred and maintained at a temperature of 70° C. for a period of 9 hours, i.e. until about 45 percent of the monomeric styrene was polymerized. A charge of 3.1 grams of Aerosol MA (dihexyl ester of sulfosuccinic acid, sodium salt) was added in about 10 ml. of water. The resulting mixture was stirred and heated at a temperature of 75° C. for 24 hours longer to complete the polymerization of the monomeric styrene. The product was recovered by filtering and was washed with water. The product was in the form of solid transparent beads. The beads had a density greater than water at 25° C., i.e. when placed in water they sunk. A portion of the product was screened through U.S. standard screens to determine the sizes of the polymer particles.

(B) In contrast, when 3.1 grams of Aerosol MA was added to the aqueous solution of the water at the start of the reaction and the monomeric styrene and the isooctane were dispersed therein and the styrene polymerized under similar conditions, the dispersed organic phase coalesced to a solid mass after heating and stirring the mixture for 17 hours and 45 minutes, i.e. after heating 9 hours at 70° C. and 8 hours and 45 minutes at 75° C. No beads were obtained.

(C) A charge of 929 grams of monomeric styrene in admixture with 71 grams of isooctane was polymerized in an aqueous suspension as described in part (A) above, except that after heating of the mixture for 9 hours at a temperature of 70° C., a charge of 3.1 grams of Duponol ME (fatty alcohol sodium sulfate) in 10 ml. of water was added to the reaction mixture in place of the Aerosol MA employed in part (A) above. Thereafter, the mixture was heated at a temperature of 75° C. for 24 hours to complete the polymerization of the styrene. The product was separated by filtering and was washed with water. The product was in the form of solid transparent beads having a density greater than that of water. A portion of the product was subjected to screen analysis.

(D) For purpose of comparison, a charge of 929 grams of monomeric styrene in admixture with 71 grams of isooctane was polymerized in an aqueous suspension as described in part (A) above, except that no surface active agent was added to the reaction during the polymerization. The product was obtained as beads and granular particles of irregular sizes, together with some agglomerated clusters of beads. Sixty-two percent by weight of the product had a density greater than that of water and 38 percent had a density less than that of water, i.e. they floated when placed in water. The "floaters" were mostly large hollow granules or granules containing gas bubbles. A portion of the product was screened to determine the sizes of the particles.

Table I identifies the experiments and names the surface active agent employed and gives the time in hours when said agent was added to the reaction. The table also gives a screen analysis of the product.

*Table I*

| Experiment | A | B | C | D |
|---|---|---|---|---|
| Surfactant | Aerosol MA | Aerosol MA | Duponol ME | None |
| Time of addition | 9 Hrs. | At Start | 9 Hrs. | |
| U.S. Standard Screen No. | Wt. Percent | Wt. Percent | Wt. Percent | Wt. Percent |
| 12 | 5.7 | | 1.1 | 33.8 |
| 14 | 24.3 | | 1.1 | 5.6 |
| 16 | 34.7 | Coalesced to | 1.7 | 5.2 |
| 18 | 21.8 | a solid | 8.7 | 12.8 |
| 20 | 7.5 | mass, no | 13.8 | 13.9 |
| 25 | 3.6 | beads. | 26.7 | 12.3 |
| 30 | 1.6 | | 26.0 | 13.4 |
| Fines | 0.8 | | 20.9 | 3.0 |
| | 100.0 | | 100.0 | 100.0 |

EXAMPLE 2

In each of a series of experiments, a charge of 704 grams of monomeric styrene, 0.13 gram of ethylvinylbenzene and 0.16 gram of divinylbenzene, together with 3.03 grams benzoyl peroxide and 1.41 grams of dicumyl peroxide as polymerization catalysts, was placed in a glass reaction vessel equipped with a reflux condenser and stirrer. An aqueous solution consisting of 1500 grams of water containing 0.45 gram of polyvinyltoluene sulfonic acid, ammonium salt, having 0.9 sulfonate group of the formula —$SO_3NH_4$ per vinyltoluene residue in the sulfonated polyvinyltoluene, 1.51 grams of ammonium sulfate, 0.75 gram of potassium dichromate and sufficient ammonium hydroxide to bring the solution to a pH of 6, was added to the reaction vessel. The resulting mixture was agitated by rotating the stirrer at a rate of 265 r.p.m. to disperse the organic material as droplets in the aqueous liquid, and was heated to a temperature of 90° C. in a period of 2 hours. Thereafter, the mixture was stirred and maintained at a temperature of 90° C. for a period of 11 hours to polymerize the monomers. After the mixture had been stirred and heated at a temperature of 90° C. for a period of time as stated in the following table, ranging from 0.5 up to 2.5 hours, i.e. after an appreciable amount of the monomers were polymerized and before agglomerating of the droplets occurred, a charge of 1.5 grams of Igepal CO–880 (alkylphenoxy polyoxyethylene ethanols) surfactant dissolved in 10 ml. of water was added. The polymerization was continued at 90° C. for a total time of 11 hours as previously stated. The product was separated by filtering and was washed with water and dried. The product was obtained in the form of opaque beads having a density greater than that of water. No "floaters," i.e. beads having a density less than that of water, were obtained. No clusters or agglomerates of beads were obtained. A portion of the product was screened through U.S. standard screens to determine the sizes of the particles of the product. Table II identifies the experiments and gives the time in hours after heating of the mixture at 90° C. at which the surfactant was added and gives the approximate degree of polymerization at the time the surfactant was added. The table also gives a screen analysis for the product. In the table, the proportion of the granules in percent by weight opposite the screen number is the proportion of the granules retained on the screen of that mesh size.

*Table II*

| | Experiment | | | |
|---|---|---|---|---|
| | 1 | 2 | 3 | 4 |
| Time of adding Surfactant, Hours | 0.5 | 1 | 1.5 | 2.5 |
| Polymerization, percent | 8 | 12 | 30 | 45 |
| U.S. Standard Screen No. | Wt. Percent | Wt. Percent | Wt. Percent | Wt. Percent |
| 12 | 0.1 | 2.2 | 10.8 | 26.3 |
| 14 | 0.6 | 6.9 | 13.6 | 8.4 |
| 16 | 1.6 | 6.8 | 6.8 | 9.0 |
| 18 | 6.7 | 12.5 | 11.5 | 24.0 |
| 20 | 8.9 | 7.1 | 10.2 | 16.0 |
| 25 | 10.6 | 9.7 | 15.5 | 11.5 |
| 30 | 14.0 | 17.9 | 21.3 | 3.6 |
| Fines | 57.5 | 36.9 | 10.3 | 1.2 |
| | 100.0 | 100.0 | 100.0 | 100.0 |

EXAMPLE 3

A charge of 1018 grams of monomeric styrene, 0.355 gram of ethylvinylbenzene and 0.41 gram of divinylbenzene in admixture with 76.5 grams of isooctane, and 4.37 grams of benzoyl peroxide and 2.18 grams of dicumyl peroxide was placed in a glass reaction vessel equipped with a reflux condenser and stirrer. An aqueous solution consisting of 1350 grams of water containing 0.4 gram of polyvinyltoluene sulfonic acid, sodium salt having an average of 0.89 sulfonate group of the formula —$SO_3Na$ per vinyltoluene residue in the polymer, 1.37 grams of sodium sulphate, 1.35 grams of potassium dichromate and sufficient sodium hydroxide to bring the aqueous solution to a pH value of 6, was added to the reaction vessel. The resulting mixture was agitated by rotating the stirrer at a rate of 294 r.p.m. and the mixture was heated to a temperature of 90° C. over a period of 2 hours. After the mixture had been heated at a temperature of 90° C. for 0.5 hour, i.e. after from 8 to 10 percent by weight of the monomers were polymerized, a charge of 0.27 gram of Duponol ME (fatty alcohol sodium sulfate) in 10 ml. of water was added. Heating and stirring of the mixture at a temperature of 90° C. was continued for a period of 10.5 hours longers to polymerize the monomer. The product was separated by filtering and was washed with water. The product was obtained as solid transparent beads having a density greater than that of water. A portion of the product was screened to determine the sizes of the particles. The product consisted of particles of sizes as follows.

| U.S. Standard Screen No.: | Product weight percent |
|---|---|
| 12 | 5.6 |
| 14 | 1.2 |
| 16 | 1.2 |
| 18 | 4.4 |
| 20 | 12.6 |
| 25 | 36.8 |
| 30 | 26.2 |
| Fines | 12.0 |
| | 100.0 |

For purpose of comparison, attempt was made to polymerize a similar charge of the monomers as described above, but without the addition of the Duponol ME surfactant to the reaction mixture. The organic material coalesced to a solid gummy mass after heating and stirring for 2 hours at a temperature of 90° C.

EXAMPLE 4

In each of a series of two experiment a charge of 960 grams of monomeric styrene, 0.25 gram of ethylvinylbenzene and 0.31 gram of divinylbenzene containing 4.12 grams of benzoyl peroxide and 1.92 grams of dicumyl peroxide as polymerization catalysts, together with 73 grams of isooctane, was placed in a glass reaction vessel equipped with a reflux condenser and a stirrer. An aqueous solution consisting of 1335 grams of water, 1.34 grams of potassium dichromate, 20.2 grams of an aqueous 10 weight percent solution of sulfonated polyvinyltoluene consisting of 23 percent by weight of polyvinyl toluene sulfonic acid, sodium salt, and 77 percent of sodium sulfate, and sufficient 6-normal sodium hydroxide to bring the aqueous solution to a pH of 6, was added to the reaction vessel. The sulfonated polyvinyl toluene employed in the experiment contained an average of 0.89 sulfonate group of the formula —SO$_3$Na per aromatic nucleus in the polyvinyltoluene polymer. Prior to employing the sulfonated polyvinyl toluene in the experiment the aqueous 10 weight percent solution of the same was passed through a homogenizer. The resulting mixture of the monomers and aqueous medium was agitated by rotating the stirrer at a rate of 224 r.p.m. to disperse the organic water-immiscible materials as fine globules in the aqueous medium, and was heated to a temperature of 90° C. in a period of 2 hours. Thereafter, the mixture was stirred and maintained at a temperature of 90° C. for a period of 11 hours longer to polymerize the monomeric styrene to solid granules. After the mixture had been heated at a temperature of 90° C. for 3 hours in experiment A, and for 4 hours in experiment B, there was added 2.5 grams (0.2 percent by weight based on the weight of the water) of Duponol ME (fatty alcohol sodium sulfate) in 10 ml. of water and the polymerization was continued. Upon completing the polymerization, the product was separated by filtering and was washed with water and was dried. The product was in the form of solid transparent beads having a density greater than that of water. A portion of the product was screened through U.S. standard screens to determine the sizes of the polymer particles. For purpose of comparison, a similar polymerization of styrene, experiment C was carried out, but without adding the Duponol ME, as described above. Table III identifies the experiments and gives the screen analysis of the product. The table also gives the time in hours after heating of the mixture at 90° C. at which the Duponol ME surfactant was added and the percent conversion of the monomers to polymer at the time of adding the surfactant.

Table III

| | Experiment | | |
|---|---|---|---|
| | A | B | C |
| Time of Adding Surfactant, Hours. | 3 | 4 | none |
| Polymerization, percent | 50 | 60 | 68 |
| U.S. Standard Screen No. | Wt. percent | Wt. percent | Wt. percent |
| 10 | 50.0 | 1.2 | Coalesced to a solid mass after 4 hours and 40 minutes; no beads |
| 12 | 22.6 | 6.0 | |
| 14 | 13.0 | 17.4 | |
| 16 | 7.2 | 28.0 | |
| 18 | 2.8 | 27.0 | |
| 20 | 1.6 | 12.2 | |
| 25 | 1.0 | 6.0 | |
| 30 | 1.6 | 1.6 | |
| Fines | 0.2 | 0.6 | |
| | 100.0 | 100.0 | |

EXAMPLE 5

A charge of 5 parts by weight of an aqueous solution containing 0.075 percent by weight of polyvinyltoluene sulfonic acid, ammonium salt, as dispersing agent and similar to that employed in Example 1, was placed in a glass reaction vessel equipped with a reflux condenser and stirrer. A charge of 4 parts by weight of monomeric styrene, containing 0.043 percent by weight of benzoyl peroxide and 0.02 percent of dicumyl peroxide, was added. The mixture was stirred and heated at a temperature of 88° C. for a total period of 11 hours to polymerized the styrene. After the mixture had been stirred and heated at a temperature of 88° C. for a time of 3 hours and 10 minutes, i.e. after about 50 percent of the styrene was polymerized, a charge of 0.02 percent by weight of Duponol ME (fatty alcohol sodium sulfate) based on the weight of the aqueous solution initially used, was added to 10 ml. of water, and the polymerization was continued. The product was separated by filtering and was washed with water and dried. The product was in the form of transparent granules having a density greater than that of water. A portion of the product was screened and found to be in particles of sizes as follows.

| U.S. Standard Screen No.: | Weight Percent |
|---|---|
| 10 | 1.3 |
| 12 | 1.3 |
| 14 | 5.2 |
| 16 | 13.0 |
| 18 | 14.3 |
| 20 | 21.6 |
| 25 | 20.0 |
| 30 | 10.9 |
| Fines | 12.5 |
| | 100.0 |

In contrast, attempt to carry out a similar polymerization, without adding the Duponol ME surfactant to the mixture during the polymerization, resulted in the dispersed globules coalescing to a gummy mass after about 55 percent of the styrene was polymerized.

EXAMPLE 6

The procedure of Example 5 was repeated employing a mixture of 99.96 percent by weight of monomeric styrene and 0.04 percent of divinylbenzene as the starting monomers. The product was obtained in the form of beads having a density greater than that of water and consisting of sizes as follows.

| U.S. Standard Screen No.: | Percent |
|---|---|
| 10 | 2.4 |
| 12 | 20.7 |
| 14 | 31.8 |
| 16 | 16.1 |
| 18 | 14.2 |
| 20 | 7.1 |
| 25 | 3.6 |
| 30 | 1.7 |
| Fines | 2.4 |
| | 100.0 |

In contrast, attempt to carry out the polymerization, without adding the Duponol ME surfactant to the mixture during the polymerization, resulted in the dispersed globules coalescing to a solid mass after about 70 percent of the monomers were polymerized.

EXAMPLE 7

A charge of 113 parts by weight of water containing 3.1 parts of an aqueous 10 weight percent solution of sulfonated polyvinyltoluene ammonium salt similar to that employed in Example 1, and 0.062 part of potassium dichromate, together with sufficient ammonium hydroxide to bring the resulting solution to a pH of 6, was placed in a pressure resistant vessel equipped with a stirrer. A charge of 100 parts of monomeric styrene 0.033 part of ethylvinylbenzene, 0.04 part of divinylbenzene and 7.2 parts of n-pentane was added, together with 0.43 part of benzoyl peroxide and 0.2 part of dicumyl peroxide. The resulting mixture was stirred in the closed vessel to disperse the monomers as droplets in the aqueous solution and was heated to a temperature of 90° C. After heating and stirring of the mixture at a temperature of 90° C. for 3.25 hours, there was added 0.045 part of Duponol ME (fatty alcohol sodium sulfate) dissolved in a small amount of water. The polymerization was continued at 90° C. for a period of 7.75 hours longer. Thereafter, the mixture was stirred and heated at a temperature of 110° C. for 8 hours longer to polymerize the monomers to solid non-sticky granules. The mixture was cooled to room temperature. The product was removed from the vessel and was washed with water and was dried. The product was in the form of transparent beads having a density greater than that of water. The product was capable of being foamed to a cellular mass. A portion of the beads were placed in a porous mold and heated with steam to a temperature of 98°–100° C. The beads foamed to a cellular mass having a density of 2 pounds per cubic foot of the foam. A portion of the product was screened to determine the particle sizes of beads and were found to be as follows.

| U.S. Standard Screen No.: | Product percent |
|---|---|
| 12 | 2.3 |
| 14 | 3.7 |
| 16 | 13.1 |
| 18 | 36.7 |
| 20 | 22.8 |
| 25 | 13.0 |
| 30 | 4.4 |
| 35 | 2.4 |
| Fines | 1.6 |
| | 100.0 |

We claim:

1. A method of controlling the particle size of a polymeric product produced by the suspension polymerization of an alkenyl aromatic compound which normally passes during polymerization from a liquid to a sticky agglomerative state and thence to a non-sticky granular condition, which method comprises maintaining a polymerization temperature between 70° and 120° C. in a constantly agitated aqueous suspension comprising a polymerizable monomeric alkenyl aromatic compound selected from the group consisting of monoalkenyl aromatic compounds having the general formula:

$$Ar-CH=CH_2$$

wherein Ar represents an aromatic radical of the group consisting of hydrocarbon and nuclear halogenated hydrocarbon radicals of the benzene series, and mixtures of from 99.5 to 99.99 percent by weight of at least one such monoalkenyl aromatic compound and from 0.5 to 0.01 percent of a divinyl aromatic hydrocarbon of the benzene series, dispersed in a liquid aqueous medium containing from 0.017 to 0.4 percent by weight, based on the weight of the water in said aqueous medium, of an alkali salt of a water-soluble sulfonated polyvinyltoluene containing an average of from 0.85 to 1 sulfonate group per vinyltoluene residue in the sulfonated polymer, until an appreciable amount of the monomer is polymerized, then adding to the aqueous suspension when from 8 to 60 percent by weight of the monomers are polymerized and prior to the occurrence of said agglomerative state, from 0.005 to 0.5 percent, based on the weight of the water in said aqueous suspension, of a surfactant selected from the group consisting of anionic and nonionic surface active agents, continuing the polymerization until the monomer is polymerized to a non-sticky granular condition, and separating the granular product from the aqueous liquid.

2. A method according to claim 1, wherein the monomeric alkenyl aromatic compound is polymerized in admixture with from 2 to 25 percent by weight of a saturated aliphatic hydrocarbon containing from 5 to 8 carbon atoms in the molecule and boiling at a temperature below 100° C. at 760 millimeters absolute pressure.

3. A method according to claim 1, wherein the alkenyl aromatic compound is styrene.

4. A method according to claim 1, wherein the alkenyl aromatic compound is a mixture of from 99.5 to 99.99 percent by weight of styrene and from 0.5 to 0.01 percent of divinylbenzene.

5. A method according to claim 1, wherein the surfactant is dihexyl ester of sulfosuccinic acid, sodium salt.

6. A method according to claim 1, wherein the surfactant is fatty alcohol sodium sulfate.

7. A method according to claim 1, wherein the surfactant is a water soluble alkylbenzene polyoxyethylene ethanol.

8. A method according to claim 2, wherein the saturated aliphatic hydrocarbon is pentane.

9. A method according to claim 4, wherein the monomers are polymerized in admixture with from 2 to 15 percent by weight of pentane.

References Cited in the file of this patent

UNITED STATES PATENTS

| 2,473,929 | Wilson | June 21, 1949 |
| 2,520,959 | Powers | Sept. 5, 1950 |
| 2,639,279 | Caldwell | May 19, 1953 |
| 2,712,536 | Winslow | July 5, 1955 |
| 2,840,549 | McNulty et al. | June 24, 1958 |

OTHER REFERENCES

McCutcheon: Soap and Chemical Specialties, January 1958, page 48 (Darvan No. 1).